United States Patent

Stadler

[11] Patent Number: 5,723,824
[45] Date of Patent: Mar. 3, 1998

[54] CHECKWEIGHER WITH A BELT CONVEYOR

[75] Inventor: Eberhard Stadler, Göttingen, Germany

[73] Assignee: Mettler-Toledo AG, Greifensee, Switzerland

[21] Appl. No.: 521,308

[22] Filed: Aug. 30, 1995

[30] Foreign Application Priority Data

Sep. 15, 1994 [DE] Germany ............... 9415016 U

[51] Int. Cl.⁶ .................. G01G 19/00; B65G 37/00
[52] U.S. Cl. ................ 177/145; 177/145; 177/52; 198/360; 198/369.7; 198/600
[58] Field of Search ........... 177/145, 52; 209/923, 209/924, 900; 198/817, 841, 360, 369.7, 600

[56] References Cited

U.S. PATENT DOCUMENTS 2,601,929  3/1952  Brichard ............... 198/841
3,289,818  12/1966  Kittredge ............... 198/841
5,230,391  7/1993  Murata et al. ............... 177/50

FOREIGN PATENT DOCUMENTS 2067494  7/1981  United Kingdom ............... 198/817

Primary Examiner—Michael L. Gellner
Assistant Examiner—Anh Mai
Attorney, Agent, or Firm—Friedrich Kueffner

[57] ABSTRACT

A checkweigher with a belt conveyor includes at least two belt conveyor sections which are arranged one behind the other in conveying direction, wherein one of the conveyor sections is a weighing bridge. The individual conveyor sections include a plurality of conveying belts which travel on a sliding surface and are guided around guide rollers at the ends of the conveyor sections. Sliding fingers formed by extensions of the sliding surface are provided adjacent the conveying belts, wherein the sliding fingers substantially bridge the gap between the adjacent conveyor sections.

8 Claims, 2 Drawing Sheets

CHECKWEIGHER WITH A BELT CONVEYOR

BACKGROUND OF THE INVENTION

1. Field of the Invention

The present invention relates to a checkweigher with a belt conveyor having at least two belt conveyor sections which are arranged one behind the other in conveying direction, wherein one of the conveyor sections comprises a weighing bridge. The individual conveyor sections include a plurality of conveying belts which travel on a sliding surface and are guided around guide rollers at the ends of the conveyor sections.

2. Description of the Related Art

In belt conveyors of this type, particularly in the case of high conveying speeds, disturbances of the sequence of movement of the material being conveyed occur at the transitions between the conveyor sections. Particularly when such belt conveyors are used in checkweighers or scales, disturbances of the weighing procedure occur at the transition to the weighing bridge.

These disturbances can be processed by utilizing signal technology. However, it is advantageous to keep the disturbances as small as possible already in the unprocessed signal. The disturbances require longer times to subside than in the case of a transition of the product which is as undisturbed as possible, wherein especially in checkweighers the time gain until the stability of measured values is reached is of great importance. For example, the increase in accuracy by suppressing disturbances at the transition points can be readily observed in those cases in which, for comparative purposes, air bearings are used for suitable, slidable products instead of the known conveying belts with rollers. The air bearings allow the material being weighed to slide on an air cushion onto the weighing bridge virtually without disturbances. This is made possible, on the one hand, by an exact adjustment of two air bearings to the same level and, on the other hand, by a very narrow gap between the stationary part and the movable part. Such an air bearing can be used only to a limited extent. Therefore, roller drives with conveying belts are predominantly used for conveying a variety of materials to be weighed.

In order to reduce the problems in transferring the material to be weighed onto and from the weighing bridge and to be able to transfer the material in an optimum manner, very complicated constructions are conceivable, such as meshing conveying belts in the transition points. Constructions of this type are complicated and difficult to maintain.

Because of the roller diameter which cannot be reduced indefinitely, a distance is necessary between the adjacent conveyor sections. It is known in the art to bridge this distance, for example, by means of additional and separate transition or intermediate plates. As a result of assembly tolerances and tolerances of structural components, many sources of errors are possible in this arrangement with respect to the relative vertical and angular positions of the following components which are arranged one behind the other and with gaps therebetween: end of sliding plate, roller height, beginning of transition plate, end of transition plate, roller height, and beginning of sliding plate. Depending on the size and properties of the products, the sequence of movements can be disturbed at all of these locations.

SUMMARY OF THE INVENTION

Therefore, it is the primary object of the present invention to provide a checkweigher with a belt conveyor of the above-described type which is improved in a very simple manner in such a way that the sequences of movements at least at one transition point between successively arranged conveyor sections take place substantially smoother and more uniform. Especially when the belt conveyor is used in a checkweigher, the weighing process is to take place with fewer disturbances and more quickly.

In accordance with the present invention, sliding fingers formed by extensions of the sliding surface are provided adjacent the conveying belts, wherein the sliding fingers substantially bridge the gap between the adjacent conveyor sections.

As a rule, the sliding surfaces are formed by sheet metal parts which are provided with the desired shapes by using known methods.

The belt conveyor used in the checkweigher according to the present invention is further improved if the conveying belts extend almost completely countersunk in grooves of the sliding surface and the surfaces of the sliding fingers extend in the plane of the upper edges of the grooves. This embodiment makes it possible to significantly reduce the difference in the level of the sliding surface and the upper surfaces of the conveying belts; depending on the types of materials being conveyed, the level difference can be reduced to fractions of a millimeter. Consequently, the possibility of tilting or tumbling of materials being conveyed can be substantially reduced. In addition, there is a better guidance of the conveying belts.

When the belt conveyor of the present invention is used in checkweighers, an embodiment is conceivable in which, for example, only the section constructed as weighing bridge is equipped with sliding fingers which bridge the gap at one or both transfer locations.

In accordance with another feature which is particularly advantageous for reasons of stability, conveying belts of adjacent conveyor sections are arranged in alignment with each other and the sliding fingers extend from the sliding surfaces of adjacent conveyor sections to the middle of the gap. As a result, the sliding fingers have only half the length. The ends of the sliding fingers are arranged opposite each other in the manner of a butt joint. Alternatively, the ends of the sliding fingers may also have complementary inclined surfaces.

In accordance with another preferred embodiment, the conveying belts of adjacent conveyor sections are arranged laterally offset relative to each other, so that the sliding fingers of one section extend in the direction of the conveying belts of the adjacent section.

As a rule, sliding fingers arranged between the conveying belts will be sufficient. In special cases, for example, in the case of relatively wide products being weighed, it may be advantageous to provide sliding fingers also at the areas of the sliding surface which are located outside of the conveying belts.

The various features of novelty which characterize the invention are pointed out with particularity in the claims annexed to and forming a part of the disclosure. For a better understanding of the invention, its operating advantages, specific objects attained by its use, reference should be had to the drawing and descriptive matter in which there are illustrated and described preferred embodiments of the invention.

DETAILED DESCRIPTION OF THE PREFERRED EMBODIMENTS

Figure 1:
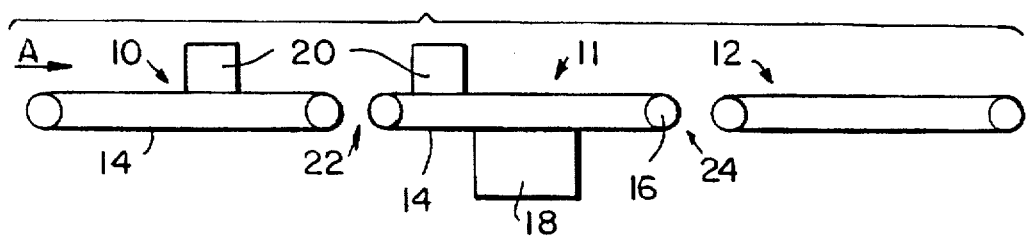
FIG. 1 is a schematic side view of a belt conveyor according to the present invention used in a checkweigher.
Figure 2:
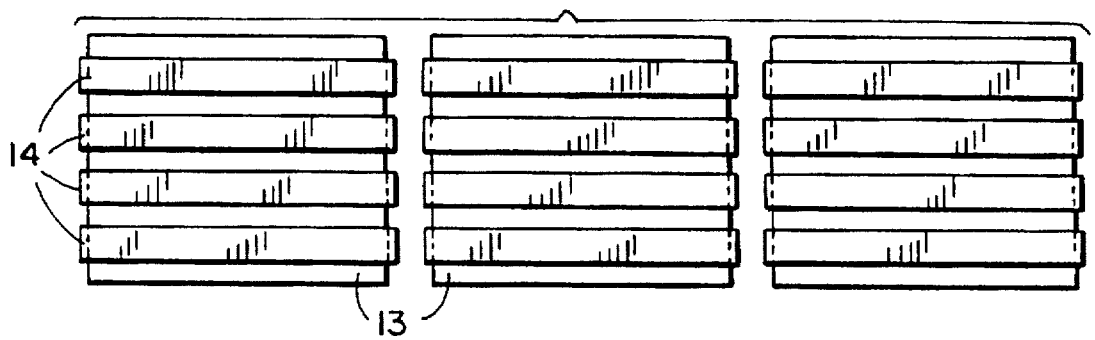
FIG. 2 is a schematic top view of the belt conveyor of FIG. 1.

FIGS. 1 and 2 of the drawing show the basic arrangement of typical checkweighers with three conveyor sections 10, 11 and 12. Each conveyor section forms its own conveyor path with, four, conveying belts 14 which travel on a sliding surface 13 and are guided at the ends of the sections around guide rollers 16. The middle section 11 includes a weighing device 18.

Such checkweighers are frequently constructed in such a way that the conveyor sections 10, 11 and 12 including drives, controls, etc., are combined in one unit. In other cases, the checkweigher may originally only include the section 11 and may be completely assembled only at the location of use by adding the sections 10 and 12. Finally, there may be cases in which the section 12 can be omitted.

In operation, the material being weighed 20 is supplied in the direction of arrow A over the section 10, the material then passes the gap 22 at the receiving side of the weighing bridge (section 11) and is weighed as it is conveyed on the weighing bridge. Subsequently, the material passes the gap 24 on the discharge side and the material is further conveyed over the section 12.

Figure 3:
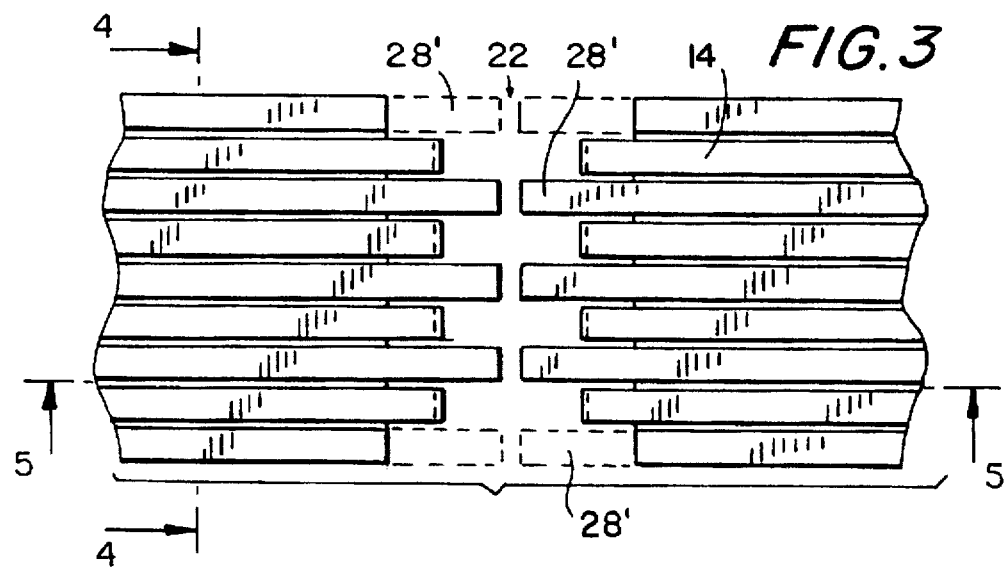
FIG. 3 is a top view, on a larger scale, of a transition point between two conveyor sections.
Figure 5:
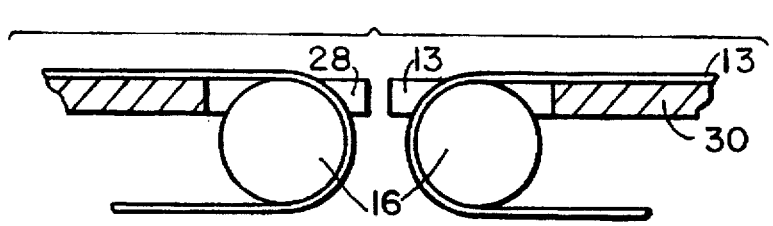
FIG. 5 is a longitudinal sectional view, also on a larger scale, taken along line 5—5 in FIG. 3.
Figure 4:
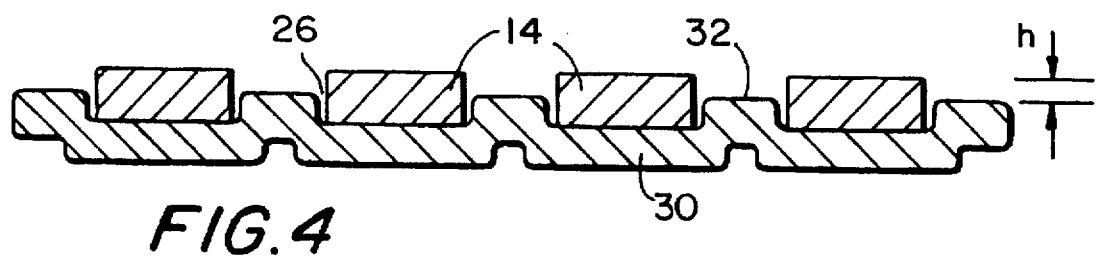
FIG. 4 is a partial sectional view, on an even larger scale, taken along sectional line 4—4 in FIG. 3.

FIGS. 3, 4 and 5 show the basic concept of the present invention in connection with the gap 22 on the receiving side of the conveyor section 11.

The conveying belts 14 travel in grooves 26 which have been produced in the sliding surface 13 by a known method, for example, pressing or deep-drawing. The sliding surface 13 is formed by a sheet metal plate 30, for example, of stainless steel. The depth of the grooves depends on the type of materials being weighed and the thickness of the weighing belts; if the materials being weighed are, for example, cans or tins, a level difference h of approximately 0.1 mm between the upper edge of the conveying belt 14 and the upper edge of the groove 26 has been found useful. The level difference h is shown in FIG. 4.

Figure 6:
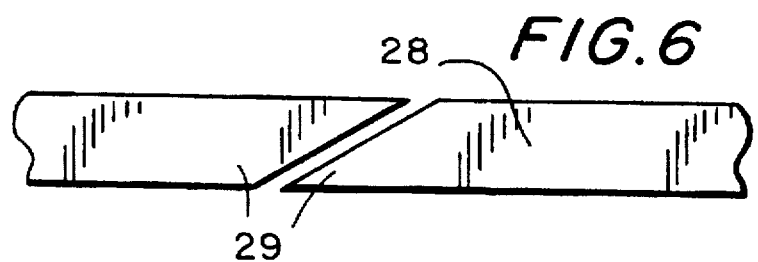
FIG. 6 is a top view, also on a larger scale, of another embodiment of the transition between two sections.

The sheet metal plates 30 of the sliding surfaces 13 are constructed at their ends in such a way that sliding fingers 28 extend into the gap 22 or 24 of the transition point, wherein the sliding fingers 28 are arranged between the grooves 26 and, thus, between the conveying belts 14. The ends of the sliding fingers 28 are located opposite each other in the manner of a butt-joint in the middle of the gap 22 or 24 and form a remaining gap of less than 1 mm. The ends of the sliding fingers 28 which are located opposite each other may also be inclined, as shown in FIG. 6. The surfaces of the sliding fingers 28 are in alignment with the upper edges 32 of the grooves 26 formed in the sliding surface 13.

Figure 7:
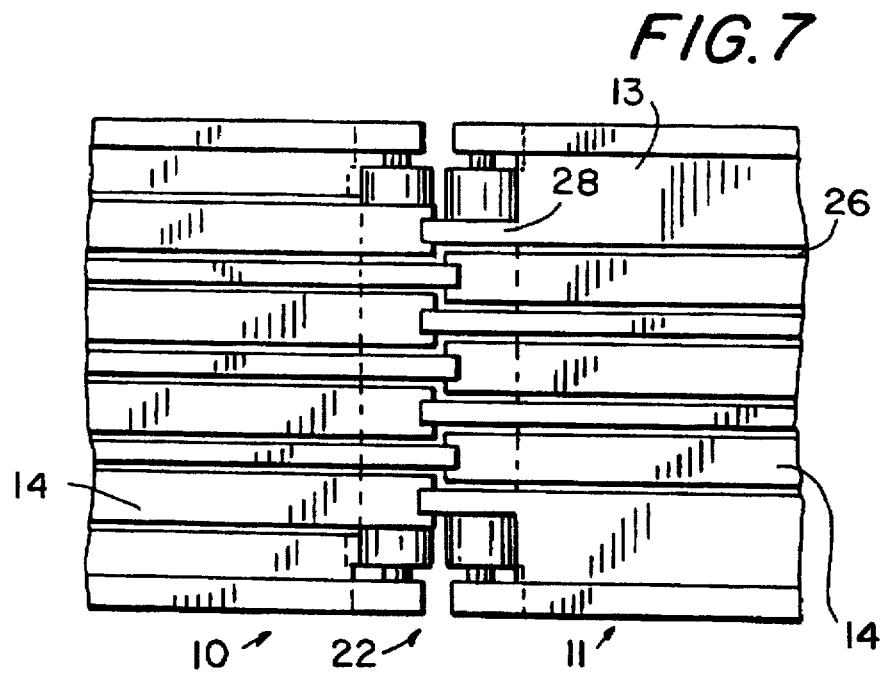
FIG. 7 is a top view of another embodiment of the belt conveyor according to the present invention.

FIG. 7 shows another embodiment of the present invention. While the conveying belts 14 of adjacent sections 10, 11 and 12 are arranged in alignment with each other in the above-described example, the conveying belts 14 of the embodiment of FIG. 7 are laterally offset relative to each other. Consequently, the sliding fingers 28 are also offset. Each sliding finger 28 of one section extends toward a conveying belt 14 of the adjacent section. The dimension of the remaining gap between the end of the sliding finger 28 and the respective conveying belt 14 depends on the configurations in each individual case; however, the remaining gap can also have a very small dimension in this embodiment.

If necessary, additional sliding fingers 28' can be provided at the outer sides of the outer conveying belts.

The advantages of the concept of the present invention are particularly apparent when weighing cans or tins having a circumferential lower flange.

Additional aspects or components of the checkweigher, i.e., type and manner of operation of the weighing device, control, drive of the conveying paths, etc., have not been described because they are conventional and not necessary for the understanding of the concept of the present invention.

The invention is not limited by the embodiments described above which are presented as examples only but can be modified in various ways within the scope of protection defined by the appended patent claims.

What is claimed is:

1. A checkweigher with a belt conveyor comprising at least two belt conveyor sections arranged one behind the other in a conveying direction and defining a gap therebetween, one of the conveyor sections comprising a weighing bridge, the conveyor sections having ends, each conveyor section comprising a sliding surface and guide rollers mounted at the ends of the conveyor section, each conveyor section further comprising a plurality of conveying belts mounted so as to travel on the sliding surface and guided around the guide rollers, the conveyor sections further comprising sliding fingers-formed by extensions of the sliding surface beyond the guide rollers, wherein the sliding fingers are arranged between the conveying belts and substantially bridge the gap between the conveyor sections.

2. The checkweigher with a belt conveyor according to claim 1, wherein the sliding surface of each conveyor section has grooves extending in the conveying direction, each conveying belt extending essentially completely countersunk in one of the grooves, the sliding fingers having upper surfaces and the grooves having upper edges extending in a plane, wherein the upper surfaces of the sliding fingers extend in the plane of the upper edges of the grooves.

3. The checkweigher with a belt conveyor according to claim 1, wherein the conveying belts of the conveyor sections arranged one behind the other in conveying direction are arranged in alignment with each other, the gap between the conveyor sections having a middle, and wherein the sliding fingers extend from the sliding surfaces of the conveyor sections to the middle of the gap.

4. The checkweigher with a belt conveyor according to claim 3, wherein the sliding fingers have ends, and wherein the ends of the sliding fingers of the conveyor sections arranged one behind the other face each other and have complementary inclined surfaces.

5. The checkweigher with a belt conveyor according to claim 1, wherein the conveying belts of the conveyor sections arranged one behind the other are offset laterally relative to each other, so that the sliding fingers of one conveyor section are in alignment with the conveying belts of the other of the conveying sections.

6. The checkweigher with a belt conveyor according to claim 1, wherein the sliding fingers extend in conveying direction from portions of the sliding surface of each conveyor section located between adjacent conveying belts.

7. The checkweigher with a belt conveyor according to claim 6, wherein the conveying belts include outermost conveying belts and the sliding surface of each conveyor section includes portions located outwardly next to the outermost conveying belts, and wherein additional sliding fingers extend from the portions of the sliding surface of each conveyor section located outwardly next to the outermost conveying belts.

8. The checkweigher with a belt conveyor according to claim 1, wherein one of the at least two belt conveyor sections is a weighing bridge of a check balance, and wherein the sliding fingers extend from the weighing bridge into the gap.

* * * * *